(12) United States Patent
Ohtomo et al.

(10) Patent No.: US 10,809,360 B2
(45) Date of Patent: Oct. 20, 2020

(54) LASER SCANNER

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 366 days.

(21) Appl. No.: 15/928,471

(22) Filed: Mar. 22, 2018

(65) Prior Publication Data

US 2018/0284235 A1 Oct. 4, 2018

(30) Foreign Application Priority Data

Mar. 31, 2017 (JP) ................................. 2017-071745

(51) Int. Cl.
| | |
|---|---|
| *G01S 7/00* | (2006.01) |
| *G01S 7/481* | (2006.01) |
| *G01S 17/10* | (2020.01) |
| *G01S 7/51* | (2006.01) |
| *G01S 17/89* | (2020.01) |
| *G01C 15/00* | (2006.01) |

(52) U.S. Cl.
CPC .......... *G01S 7/4817* (2013.01); *G01C 15/002* (2013.01); *G01S 7/003* (2013.01); *G01S 7/51* (2013.01); *G01S 17/10* (2013.01); *G01S 17/89* (2013.01)

(58) Field of Classification Search
USPC ............................................... 356/4.01, 5.01
See application file for complete search history.

(56) References Cited

U.S. PATENT DOCUMENTS

| 6,330,523 B1 * | 12/2001 | Kacyra | ................ | G01B 11/002 250/336.1 |
| 7,319,512 B2 * | 1/2008 | Ohtomo | ............... | G01O 15/002 356/4.01 |
| 8,857,069 B2 * | 10/2014 | Adegawa | ................. | G01C 9/00 33/291 |

(Continued)

FOREIGN PATENT DOCUMENTS

| JP | 2016-151423 A | 8/2016 |
| JP | 2017-44550 A | 3/2017 |

*Primary Examiner* — James R Hulka
(74) *Attorney, Agent, or Firm* — Nields, Lemack & Frame, LLC

(57) ABSTRACT

A laser scanner comprises a scanner main unit, wherein the scanner main unit has a distance measuring light projecting component for projecting a distance measuring light, a light receiving component for receiving a reflected distance measuring light, a distance measuring component for performing a distance measurement based on a light receiving signal from the light receiving component, an optical axis deflecting unit for deflecting a distance measuring optical axis, a projecting direction detecting unit for detecting a deflection angle of the distance measuring optical axis, a storage component which stores three-dimensional design drawing data of an object to be measured and a control component for controlling the optical axis deflecting unit and the distance measuring component, wherein the control component acquires scanning data by scanning a measurement range and extracts an actual ridge line or an actual intersection point of the object to be measured based on the scanning data.

18 Claims, 8 Drawing Sheets

(56) References Cited

U.S. PATENT DOCUMENTS

| | | | |
|---|---|---|---|
| 9,019,477 B2* | 4/2015 | Matsumoto | G01S 17/42 356/4.01 |
| 9,103,678 B2* | 8/2015 | Kumagai | G01O 15/002 |
| 9,395,174 B2* | 7/2016 | Bridges | G06T 7/73 |
| 9,541,390 B2* | 1/2017 | Maruyama | G01C 15/002 |
| 9,869,549 B2* | 1/2018 | Graesser | G01C 15/00 |
| 9,897,436 B2* | 2/2018 | Ohtomo | G01C 15/002 |
| 9,967,545 B2* | 5/2018 | Tohme | G01O 15/002 |
| 10,048,063 B2* | 8/2018 | Ohtomo | G06T 7/20 |
| 10,048,377 B2* | 8/2018 | Ohtomo | G01C 15/008 |
| 10,088,307 B2* | 10/2018 | Ohtomo | G01S 17/89 |
| 10,309,774 B2* | 6/2019 | Ohtomo | G01S 17/86 |
| 10,324,183 B2* | 6/2019 | Ohtomo | G01S 17/89 |
| 10,330,788 B2* | 6/2019 | Ohtomo | G01C 9/18 |
| 10,371,801 B2* | 8/2019 | Ohtomo | G01S 17/08 |
| 10,520,307 B2* | 12/2019 | Ohtomo | G01S 7/4817 |
| 10,605,600 B2* | 3/2020 | Nishita | G01S 17/66 |
| 10,634,795 B2* | 4/2020 | Ohtomo | G01S 19/41 |
| 2005/0275824 A1* | 12/2005 | Ohtomo | G01O 15/002 356/4.03 |
| 2006/0242850 A1* | 11/2006 | Ammann | G01C 15/004 33/290 |
| 2008/0075326 A1* | 3/2008 | Otani | G01C 11/06 382/106 |
| 2008/0278715 A1* | 11/2008 | Swenson | G01S 17/10 356/141.5 |
| 2011/0222020 A1* | 9/2011 | Izatt | G01B 9/02091 351/205 |
| 2011/0263955 A1* | 10/2011 | Narita | A61B 5/0073 600/341 |
| 2012/0105923 A1* | 5/2012 | Mikkelsen | G02B 26/0891 358/475 |
| 2012/0154784 A1* | 6/2012 | Kaufman | G06T 7/521 356/4.01 |
| 2012/0216413 A1* | 8/2012 | Adegawa | G01C 15/004 33/290 |
| 2012/0249997 A1* | 10/2012 | Matsumoto | G01S 7/4817 356/4.01 |
| 2013/0174432 A1* | 7/2013 | Kumagai | G01O 23/00 33/286 |
| 2015/0043009 A1* | 2/2015 | Bridges | G01S 17/36 356/610 |
| 2015/0176991 A1* | 6/2015 | Maruyama | G01C 15/002 356/247 |
| 2015/0276401 A1* | 10/2015 | Graesser | G01C 15/00 33/290 |
| 2015/0377605 A1* | 12/2015 | Bridges | G01B 11/002 382/106 |
| 2016/0238385 A1* | 8/2016 | Ohtomo | G01O 1/04 |
| 2016/0238708 A1 | 8/2016 | Ohtomo et al. | |
| 2017/0059696 A1* | 3/2017 | Ohtomo | G01C 3/08 |
| 2017/0059709 A1 | 3/2017 | Ohtomo et al. | |
| 2017/0227357 A1* | 8/2017 | Ohtomo | G01S 17/86 |
| 2017/0280132 A1* | 9/2017 | Tohme | G01S 7/4808 |
| 2017/0350692 A1* | 12/2017 | Ohtomo | G06T 11/60 |
| 2018/0081056 A1* | 3/2018 | Ohtomo | G01C 15/002 |
| 2018/0135973 A1* | 5/2018 | Ohtomo | G06T 7/30 |
| 2018/0217263 A1* | 8/2018 | Ohtomo | G01C 15/06 |
| 2018/0372492 A1* | 12/2018 | Ohtomo | G01O 1/04 |
| 2019/0063920 A1* | 2/2019 | Nishita | G01S 17/42 |

* cited by examiner

LASER SCANNER

BACKGROUND OF THE INVENTION

The present invention relates to a laser scanner for acquiring point cloud data particularly inside a structure.

As a surveying instrument for measuring three-dimensional coordinates of an object to be measured, there is a three-dimensional laser scanner, for instance. The laser scanner is configured to scan the object to be measured with a distance measuring light and to measure a three-dimensional shape of the object to be measured at a high speed.

A conventional laser scanner rotary irradiates the distance measuring light by rotating mainly a mirror in a vertical direction and in a horizontal direction and measures the three-dimensional shape of the object to be measured. Therefore, a raster-type point cloud is acquired, and it is difficult to locally scan an arbitrary range or an arbitrary portion with the distance measuring light.

For this reason, conventionally, in a case where a three-dimensional shape of an inside of a structure such as a building or the like is acquired, a mirror is horizontally rotated by approximately 180° while the mirror is rotated vertically, and point cloud data of a total circumference of 360° is acquired. Therefore, an enormous amount of point cloud data is acquired, and it takes time to extract necessary straight lines, points, and curves from the point cloud data.

Further, when a structure is constructed, positions of the straight lines and points extracted from the point cloud data are compared with straight lines and points on design drawing data (three-dimensional CAD data) for each construction process, and whether or not each process has been correctly carried out is checked. However, since it takes time to acquire the point cloud data and to extract the necessary straight lines and the like, a checking operation after each process requires time.

SUMMARY OF THE INVENTION

It is an object of the present invention to provide a laser scanner which enables to easily extract ridge lines and intersection points which exist in a measurement range by scanning a predetermined measurement range.

To attain the object as described above, a laser scanner according to the present invention comprises scanner main unit, a support unit for supporting the scanner main unit rotatably in an up-and-down direction and in a left-and-right direction, a rotation driving unit for rotating the scanner main unit in the up-and-down direction and in the left-and-right direction and an angle detector for detecting an up-and-down angle and a left-and-right angle of the scanner main unit, wherein the scanner main unit has a light emitting element for emitting a distance measuring light, a distance measuring light projecting component for projecting the distance measuring light, a light receiving component for receiving a reflected distance measuring light, a photodetector for receiving the reflected distance measuring light and producing a light receiving signal, a distance measuring component for performing a distance measurement of an object to be measured based on the light receiving signal from the photodetector, an optical axis deflecting unit provided on a distance measuring optical axis and for deflecting the distance measuring optical axis, a projecting direction detecting unit for detecting a deflection angle of the distance measuring optical axis, a storage component which stores three-dimensional design drawing data of the object to be measured and a control component for controlling an operation of the rotation driving unit, a deflecting operation of the optical axis deflecting unit and a distance measuring operation of the distance measuring component, wherein the optical axis deflecting unit comprises a pair of optical prisms which enables to rotate with the distance measuring optical axis as a center and motors for individually and independently rotating the optical prisms, and wherein the control component is configured to acquire scanning data by scanning a measurement range as set based on the design drawing data with the distance measuring light and to extract an actual ridge line or an actual intersection point of the object to be measured based on the scanning data.

Further, in the laser scanner according to the present invention, the scanner main unit is installed at a known point, and the control component controls the rotation driving unit and the optical axis deflecting unit so as to acquire the scanning data around virtual intersection points at two points on the design drawing data, extracts actual intersection points at two points from the scanning data as acquired and extracts a line connecting the actual intersection points at the two points as the actual ridge line.

Further, in the laser scanner according to the present invention, the scanner main unit is installed at a known point, and the control component controls the rotation driving unit and the optical axis deflecting unit so as to acquire the scanning data along a virtual ridge line on the design drawing data, extracts the actual ridge line from the scanning data as acquired and compares a position of the actual ridge line and a position of the virtual ridge line.

Further, in the laser scanner according to the present invention, the scanner main unit is installed at a known point, and the control component controls the rotation driving unit and the optical axis deflecting unit so as to acquire the scanning data around the virtual intersection point on the design drawing data, extracts the actual intersection point from the scanning data as acquired and compares a position of the actual intersection point and a position of the virtual intersection point.

Further, in the laser scanner according to the present invention, a display module is provided in the scanner main unit, and the display module displays the actual ridge line or the actual intersection point and the virtual ridge line or the virtual intersection point at the same time.

Further, in the laser scanner according to the present invention, the display module displays the actual ridge line or the actual intersection point and the virtual ridge line or the virtual intersection point in different colors.

Further, in the laser scanner according to the present invention, the scanner main unit further comprises an image pickup component having an image pickup optical axis in parallel to the distance measuring optical axis which is not deflected by the optical axis deflecting unit, and an image processing component, wherein the image processing component extracts a ridge line and an intersection point of the object to be measured by an edge detection processing from an image acquired by the image pickup component, and wherein the control component acquires the scanning data within a measurement range as set based on the ridge line or the intersection point extracted from the image in a case where there is no virtual ridge line or virtual intersection point coinciding with or corresponding to the ridge line or the intersection point extracted from the image and makes the actual ridge line or the actual intersection point extracted from the scanning data display on the display module.

Further, in the laser scanner according to the present invention, the control component makes the image match with the scanning data based on the actual ridge line or the actual intersection point extracted from the image and the ridge line or the intersection point extracted from the scanning data.

Further, the laser scanner according to the present invention further comprises a communication component which enables to communicate with an external terminal device, and configured to enable to transmit data from the scanner main unit to the external terminal device via the communication component, to transmit an operation signal of the scanner main unit from the external terminal device, and to remotely control the scanner main unit.

Further, in the laser scanner according to the present invention, the external terminal device has a terminal display module, and the control component makes the actual ridge line or the actual intersection point and the virtual ridge line or the virtual intersection point display on the terminal display module at the same time.

Furthermore, in the laser scanner according to the present invention, the external terminal device has a terminal storage component which stores the three-dimensional design drawing data of the object to be measured, the terminal display module and a terminal control component, and the terminal control component makes the actual ridge line or the actual intersection point and the virtual ridge line or the virtual intersection point display on the terminal display module at the same time based on the data received from the scanner main unit.

According to the present invention, the laser scanner comprises a scanner main unit, a support unit for supporting the scanner main unit rotatably in an up-and-down direction and in a left-and-right direction, a rotation driving unit for rotating the scanner main unit in the up-and-down direction and in the left-and-right direction and an angle detector for detecting an up-and-down angle and a left-and-right angle of the scanner main unit, wherein the scanner main unit has a light emitting element for emitting a distance measuring light, a distance measuring light projecting component for projecting the distance measuring light, a light receiving component for receiving a reflected distance measuring light, a photodetector for receiving the reflected distance measuring light and producing a light receiving signal, a distance measuring component for performing a distance measurement of an object to be measured based on the light receiving signal from the photodetector, an optical axis deflecting unit provided on a distance measuring optical axis and for deflecting the distance measuring optical axis, a projecting direction detecting unit for detecting a deflection angle of the distance measuring optical axis, a storage component which stores three-dimensional design drawing data of the object to be measured and a control component for controlling an operation of the rotation driving unit, a deflecting operation of the optical axis deflecting unit and a distance measuring operation of the distance measuring component, wherein the optical axis deflecting unit comprises a pair of optical prisms which enables to rotate with the distance measuring optical axis as a center and motors for individually and independently rotating the optical prisms, and wherein the control component is configured to acquire scanning data by scanning a measurement range as set based on the design drawing data with the distance measuring light and to extract an actual ridge line or an actual intersection point of the object to be measured based on the scanning data. As a result, the actual ridge line and intersection points can be extracted without acquiring scanning data of a total circumference of 360°, the number of data used for a calculation for extracting the actual ridge line and intersection point can be reduced, and it is possible to shorten an extraction time and reduce a process of the calculation.

DETAILED DESCRIPTION OF THE PREFERRED EMBODIMENT

A description will be given below on embodiments of the present invention by referring to the attached drawings.

First, a description will be given on general features of a surveying system which comprises a laser scanner according to the present embodiment in FIG. 1.

Figure 1:
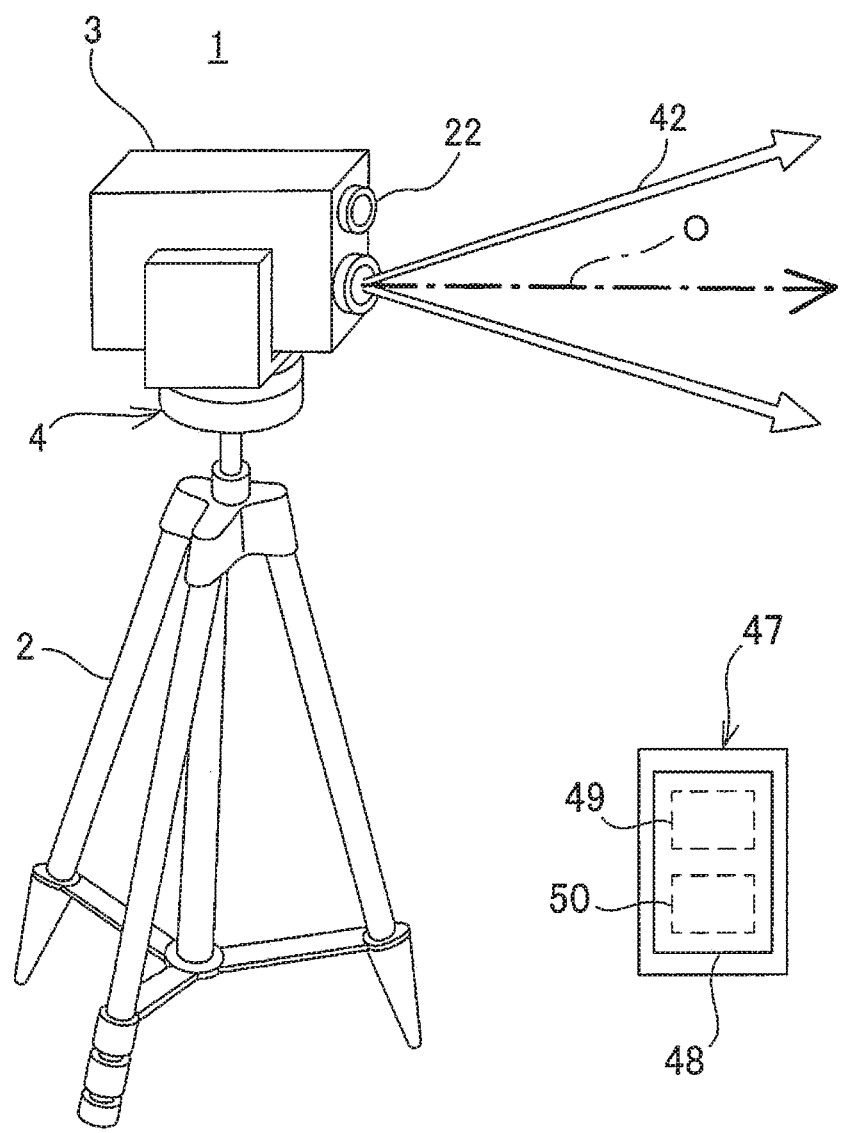
FIG. 1 is an external view of a laser scanner according to an embodiment of the present invention.

In FIG. 1, a reference numeral 1 denotes a laser scanner, a reference sign O denotes a distance measuring optical axis in a state where an optical axis is not deflected, and the distance measuring optical axis at this moment is determined as a reference optical axis.

The laser scanner 1 is mainly constituted of a tripod 2 as a support unit, a scanner main unit 3, and an installment base unit 4 which is a supporting part. The installment base unit 4 is mounted on an upper end of the tripod 2, and the scanner main unit 3 is supported by the installment base unit 4 capable of rotating in an up-and-down direction and in a left-and-right direction, respectively.

The scanner main unit 3 has a built-in distance measuring component (to be described later), a built-in attitude detecting unit 25 (to be described later), and a communication component 40 (to be described later). The distance measuring component projects a distance measuring light toward an object to be measured or a measurement range, receives a reflected distance measuring light and performs a distance measurement. Further, the attitude detecting unit 25 can detect an attitude of the scanner main unit 3 with respect to the vertical (or the horizontal) with high accuracy. Further, the communication component 40 can transmit/receive various types of data to and from an external terminal device 47.

The external terminal device 47 is a smart phone or a tablet, for instance, and has a terminal display module 48, a terminal control component 49, and a terminal storage component 50. It is to be noted that the terminal display module 48 is a touch panel and serves also as an operation module.

Figure 2:
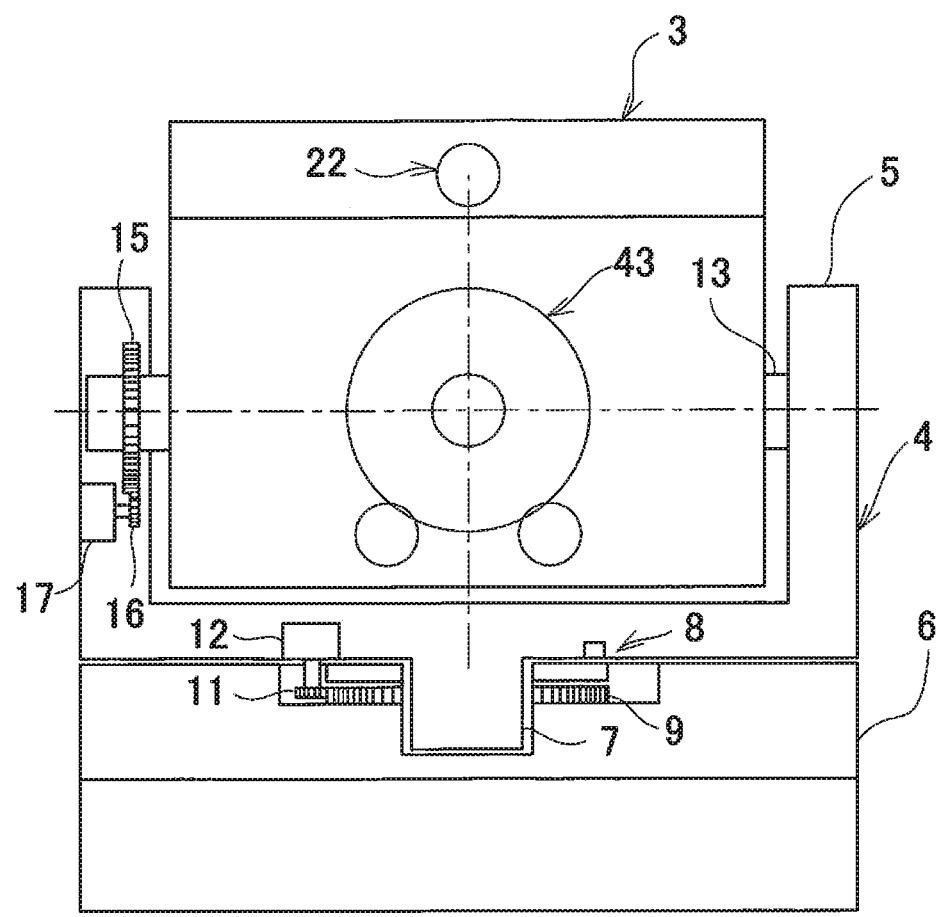
FIG. 2 is a front view to show a scanner main unit and an installment base unit according to the embodiment of the present invention.

As shown in FIG. 2, the installment base unit 4 has a frame member 5 and a base unit 6. From a lower surface of the frame member 5, a left-and-right rotation shaft 7 is protruded, and the left-and-right rotation shaft 7 is rotatably fitted to the base unit 6 via a bearing (riot shown). The frame member 5 is arranged to be rotatable in the left-and-right direction around the left-and-right rotation shaft 7 as a center.

Further, between the left-and-right rotation shaft 7 and the base unit 6, there is provided a left-and-right angle detector 8 (e.g., an encoder) for detecting a left-and-right angle (an angle in a rotating direction around the left-and-right rotation shaft 7 as the center). It is so arranged that a relative rotation angle in the left-and-right direction of the frame member 5 with respect to the base unit 6 can be detected by the left-and-right angle detector 8.

On the base unit 6, a left-and-right rotation gear 9 is fixed concentrically with the left-and-right rotation shaft 7, and a left-and-right pinion gear 11 is meshed with the left-and-right rotation gear 9. A left-and-right motor 12 as a left-and-right rotation driving unit is provided on the frame unit 5, and the left-and-right pinion gear 11 is fixedly attached to an output shaft of the left-and-right motor 12.

By a driving of the left-and-right motor 12, the left-and-right pinion gear 11 is rotated, and the left-and-right pinion gear 11 is rotated around the left-and-right rotation gear 9. Further, the frame member 5 and the scanner main unit 3 are integrally rotated. Thus, by the left-and-right motor 12, the scanner main unit 3 is rotated in the left-and-right direction.

The frame unit 5 is designed in a recessed form having a recessed portion, and the scanner main unit 3 is accommodated in the recessed portion. The scanner main unit 3 is supported on the frame member 5 via an up-and-down rotation shaft 13, and is arranged to be rotatable in the up-and-down direction around the up-and-down rotation shaft 13 as the center.

On one end of the up-and-down rotation shaft 13, an up-and-down rotation gear 15 is fitted and fixed, and an up-and-down pinion gear 16 is meshed with the up-and-down rotation gear 15. The up-and-down pinion gear 16 is fixedly attached to an output shaft of an up-and-down motor 17 as an up-and-down rotation driving unit as provided on the frame member 5. By driving the up-and-down motor 17, the up-and-down pinion gear 16 is rotated. Further, the scanner main unit 3 is rotated via the up-and-down rotation gear 15 and the up-and-down rotation shaft 13. Thus, the scanner main unit 3 is rotated in the up-and-down direction by the up-and-down motor 17.

The left-and-right motor 12 and the up-and-down motor 17 are controlled so as to have a rotation amount as required with a timing as required by an arithmetic control component 26 (to be described later) as a control component.

The rotation amount of the left-and-right motor 12 (i.e., a left-and-right angle of the frame unit 5) is detected by the left-and-right angle detector 8. The rotation amount of the up-and-down motor 17 (i.e., an up-and-down angle of the scanner main unit 3) is detected by the attitude detecting unit 25 (see FIG. 3).

Thus, the left-and-right angle and the up-and-down angle of the scanner main unit 3 are detected by the left-and-right angle detector 8 and the attitude detecting unit 25 respectively, and detection results are input to the arithmetic control component 26, respectively. It is to be noted that a rotation driving unit is constituted by the left-and-right motor 12 and the up-and-down motor 17. Further, an angle detector is constituted by the left-and-right angle detector 8 and the attitude detecting unit 25.

Figure 3:
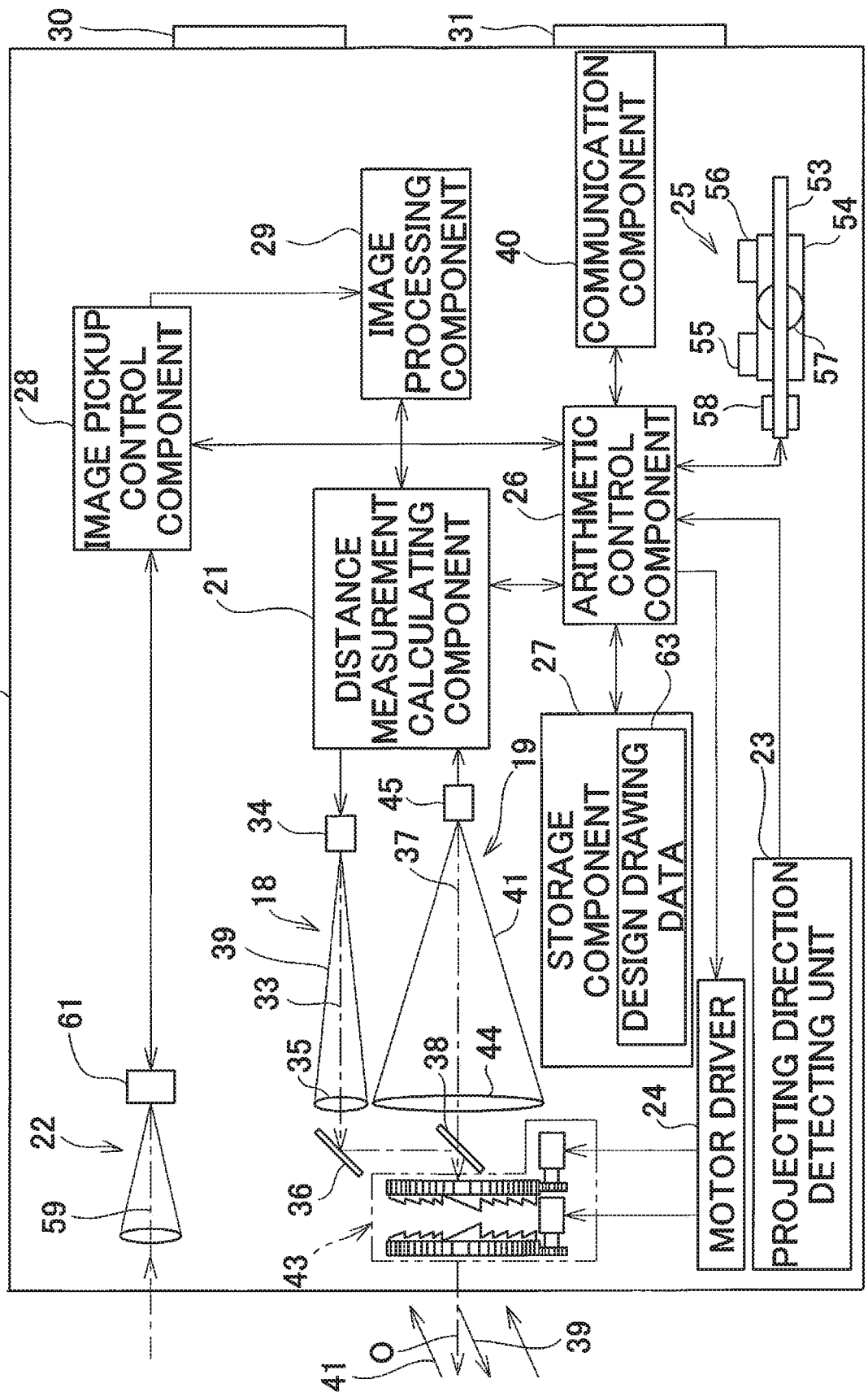
FIG. 3 is a schematical block diagram of the scanner main unit.

Next, a description will be given on the scanner main unit 3 by referring to FIG. 3.

The scanner main unit 3 includes a distance measuring light projecting component 18, a light receiving component 19, a distance measurement calculating component 21, an image pickup component 22, a projecting direction detecting unit 23, a motor deriver 24, the attitude detecting unit 25, the arithmetic control component 26, a storage component 27, an image pickup control component 28, an image processing component 29, a display module 30, an operation module 31, and a communication component 40, and these units and components are accommodated in a case 32 and integrated. It is to be noted that the distance measuring light projecting component 18, the light receiving component 19, the distance measurement calculating component 21, or the like constitute the distance measuring component.

The distance measuring light projecting component 18 has a projection optical axis 33, and a light emitting element 34 e.g. a laser diode (LD) is provided on the projection optical axis 33. Further, a projecting lens 35 is provided on the projection optical axis 33. Further, the projection optical axis 33 is deflected by a first reflection mirror 36 as a deflecting optical component disposed on the projection optical axis 33 and a second reflection mirror 38 as a deflecting optical component disposed on a light receiving optical axis 37 (to be described later) so as to coincide with the light receiving optical axis 37. The first reflection mirror 36 and the second reflection mirror 38 constitute a projection optical axis deflecting unit.

The light emitting element 34 emits a pulsed laser beam. The distance measuring light projecting component 18 projects the pulsed laser beam emitted from the light emitting element 34 as a distance measuring light 39.

A description will be given on the light receiving component 19. A reflected distance measuring light 41 from an object to be measured (i.e., a measuring point) enters the light receiving component 19. The light receiving component 19 has the light receiving optical axis 37. The projection optical axis 33 deflected by the first reflection mirror 36 and the second reflection mirror 38 coincides with the light receiving optical axis 37 as described above. It is to be noted that a state where the projection optical axis 33 coincides with the light receiving optical axis 37 is determined as a distance measuring optical axis 42 (see FIG. 1).

An optical axis deflecting unit 43 (to be described later) is disposed on the projection optical axis 33 as deflected, i.e., on the light receiving optical axis 37. A straight optical axis passing through a center of the optical axis deflecting unit 43 is the reference optical axis O. The reference optical axis O coincides with the projection optical axis 33 or the light receiving optical axis 37 of when is not deflected by the optical axis deflecting unit 43.

An image forming lens 44 is disposed on the light receiving optical axis 37 which passes through the optical axis deflecting unit 43, and a photodetector 45, for instance, a photodiode (PD) is also disposed on the light receiving optical axis 37. The image forming lens 44 focuses the reflected distance measuring light 41 on the photodetector 45. The photodetector 45 receives the reflected distance measuring light 41 and produces a light receiving signal. The light receiving signal is input to the distance measurement calculating component 21. The distance measurement calculating component 21 performs the distance measurement to the measuring point based on the light receiving signal.

Figure 4:
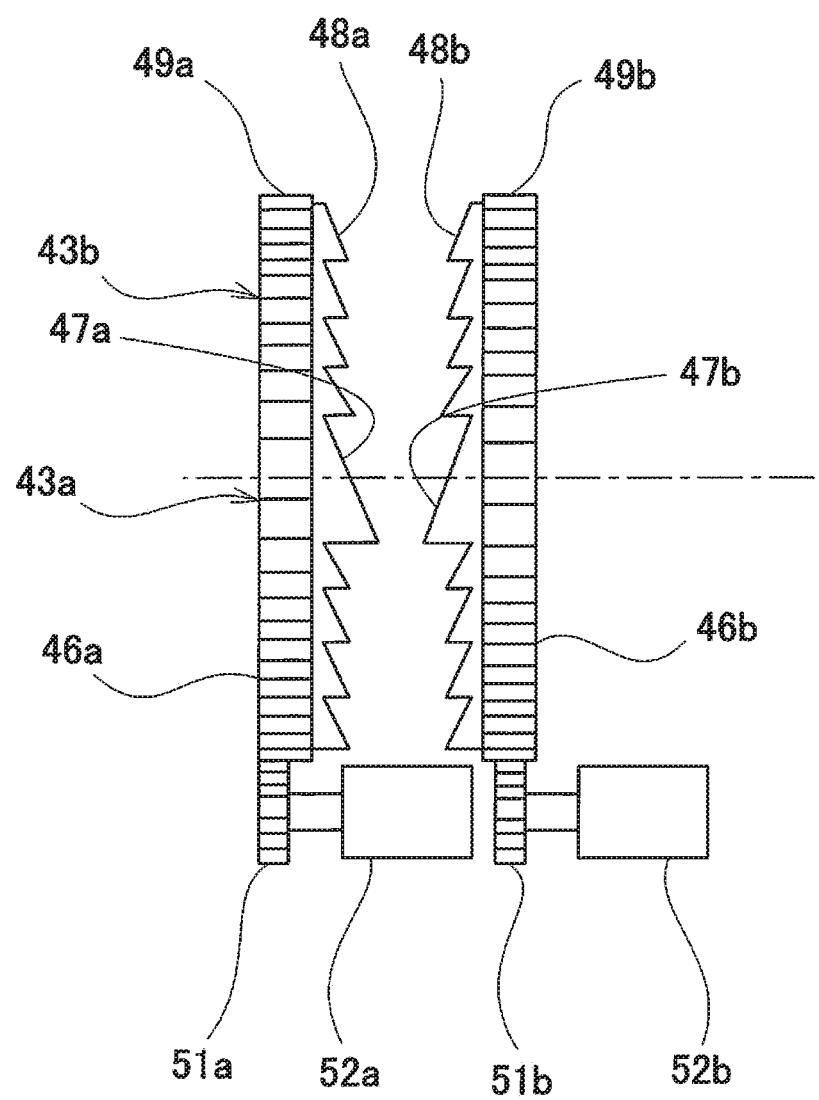
FIG. 4 is a schematical drawing of an optical axis deflecting unit in the scanner main unit.

A description will be given on the optical axis deflecting unit 43 by referring to FIG. 4.

The optical axis deflecting unit 43 is constituted of a pair of optical prisms 46a and 46b. The optical prisms 46a and 46b has a disk-like shape respectively, disposed on the light receiving optical axis 37 so as to be orthogonal to the light receiving optical axis 37, overlapped on each other and arranged in parallel to each other. As for the optical prisms 46a and 46b, a Fresnel prism is preferably used respectively, in order to reduce a size of the instrument.

A center part of the optical axis deflecting unit 43 is designed as a distance measuring light deflecting unit 43a which is a first optical axis deflecting unit which the distance measuring light 39 passes through and is projected from. A portion except the central part of the optical axis deflecting unit 43 is designed as a reflected distance measuring light deflecting unit 43b which is a second optical axis deflecting unit which the reflected distance measuring light 41 passes through and enters.

The Fresnel prisms used as the optical prisms 46a and 46b are constituted of a single prism element 47a and a single prism element 47b and a large number of prism elements 48a and 48b, which are formed in parallel to each other respectively, and have a disk-like shape. The optical prisms 46a and 46b, each of the prism elements 47a and 47b and the prism elements 48a and 48b have the same optical characteristics, respectively. Further, the prism elements 47a and 47b and the prism elements 48a and 48b are different type and different shape of prisms, respectively.

The prism elements 47a and 47b constitute the distance measuring light deflecting unit 43a, and the prism elements 48a and 48b constitute the reflected distance measuring light deflecting unit 43b.

The Fresnel prism may be manufactured from an optical glass or may be molded by using an optical plastic material. By molding the Fresnel prism by using the optical plastic material, an inexpensive Fresnel prism can be manufactured.

The optical prisms 46a and 46b are arranged in such a manner that the optical prisms 46a and 46b can independently and individually rotate with the light receiving optical axis 37 as the center respectively. By independently controlling rotating directions, rotation amounts and rotating speeds, the optical prisms 46a and 46b deflect the projection optical axis 33 of the distance measuring light 39 as emitted in an arbitrary direction, and deflect the light receiving optical axis 37 of the reflected distance measuring light 41 as received in parallel to the projection optical axis 33.

An outer shape of each of the optical prisms 46a and 46b is designed in a circle shape with the light receiving optical axis 37 as the center, respectively. Taking an expansion of the reflected distance measuring light 41 into consideration, diameters of the optical prisms 46a and 46b are set so that a sufficient light amount can be obtained. Further, diameters of the prism elements 47a and 47b are equal or substantially equal to a luminous flux diameter of the distance measuring light 39.

A ring gear 49a is fitted with an outer periphery of the optical prism 46a, and a ring gear 49b is fitted with an outer periphery of the optical prism 46b.

A driving gear 51a meshes with the ring gear 49a, and the driving gear 51a is fixed to an output shaft of a motor 52a. Similarly, a driving gear 51b meshes with the ring gear 49b, and the driving gear 51b is fixed to an output shaft of a motor 52b. The motors 52a and 52b are electrically connected to the motor driver 24.

As the motors 52a and 52b, a motor which can detect a rotation angle or a motor which rotates corresponding to a driving input value, e.g., a pulse motor is used. Alternatively, by using a rotation angle detector which detects a rotation amount (the rotation angle) of the motor, e.g., an encoder or the like, the rotation amount of the motor may be detected. The rotation amounts of the motors 52a and 52b are detected respectively, and the motors 52a and 52b are individually controlled by the motor driver 24. It is to be noted that encoders may be directly attached to the ring gears 49a and 49b respectively so that the rotation angles of the ring gears 49a and 49b are directly detected by the encoders.

The driving gears 51a and 51b and the motors 52a and 52b are provided at positions not interfering with the distance measuring light projecting component 18, for instance, on a lower side of the ring gears 49a and 49b.

The projecting lens 35, the first reflection mirror 36, the second reflection mirror 38, the distance measuring light deflecting unit 43a or the like make up a light projecting optical system, and the reflected distance measuring light deflecting unit 43b, the image forming lens 44 or the like make up a light receiving optical system.

The distance measurement calculating component 21 controls the light emitting element 34 and makes the light emitting element 34 emit a pulsed laser beam as the distance measuring light 39. The arithmetic control component 26 controls the rotation of the optical prism 46a and 46b. The projection optical axis 33 is deflected by the prism elements 47a and 47b (distance measuring light deflecting unit 43a) so that the distance measuring light 39 is directed toward the measuring point.

The reflected distance measuring light 41 as reflected from the object to be measured enters through the prism elements 48a and 48b (the reflected distance measuring light deflecting unit 43b) and the image forming lens 44, and is received by the photodetector 45. The photodetector 45 sends a light receiving signal to the distance measurement calculating component 21, and the distance measurement calculating component 21 performs the distance measurement at the measuring point (a point irradiated with the distance measuring light) per each pulsed light based on the light receiving signal from the photodetector 45, and distance measurement data is stored in the storage component 27. Thus, the distance measurement data at each of the measuring points can be acquired by performing the distance measurement per each pulse light while scanning the distance measuring light 39.

The projecting direction detecting unit 23 counts driving pulses input to the motors 52a and 52b and detects rotation angles of the motors 52a and 52b. Alternatively, the projecting direction detecting unit 23 detects the rotation angles of the motors 52a and 52b based on the signal from the encoders. Further, the projecting direction detecting unit 23 calculates rotational positions of the optical prisms 46a and 46b based on the rotation angles of the motors 52a and 52b. Further, the projecting direction detecting unit 23 calculates a deflection angle and a projecting direction of the distance measuring light based on refractive indexes and the rotational positions of the optical prisms 46a and 46b, and calculation results are input to the arithmetic control component 26.

The arithmetic control component 26 calculates a horizontal angle and a vertical angle of the measuring point based on the deflection angle and the projection direction of the distance measuring light. Further, the arithmetic control component 26 associates the horizontal angle and the vertical angle with the distance measurement data with respect to each of the measuring points. Thereby, three-dimensional data of the measuring point can be acquired.

A description will be given on the attitude detecting unit 25. It is to be noted that, as the attitude detecting unit 25, an attitude detecting unit disclosed in Japanese Patent Laid-open Publication No. 2016-151423 can be used.

The attitude detecting unit 25 has a frame 53. The frame 53 is fixed to the case 32 or fixed to a structural member and integrated with the scanner main unit 3.

A sensor block 54 is attached on the frame 53 via a gimbal. The sensor block 54 can freely rotate 360° around two axes which are orthogonal to each other.

A first tilt sensor 55 and a second tilt sensor 56 are attached on the sensor block 54.

The first tilt sensor 55 is for detecting the horizontal with high accuracy, for instance, a tilt sensor, a tilt detector which allows a detection light to enter a horizontal liquid surface and detects the horizontal based on a change in a reflection angle of the reflected light or a bubble tube which detects a tilt by a positional change of a sealed air bubble. Further, the second tilt sensor 56 is for detecting a change in a tilt with high responsiveness and is, e.g., an acceleration sensor.

Relative rotation angles of the two axes of the sensor block 54 with respect to the frame 53 are detected by encoders 57 and 58.

Further, a motor (not shown) which rotates the sensor block 54 and maintains the sensor block 54 horizontally is provided with respect to each of the two axes respectively. The motors are controlled by the arithmetic control component 26 so as to maintain the sensor block 54 horizontally based on detection results from the first tilt sensor 55 and the second tilt sensor 56.

In a case where the sensor block 54 tilts (in a case where the scanner main unit 3 tilts), the relative rotation angles with respect to the sensor block 54 are detected by the encoders 57 and 58. The arithmetic control component 26 calculates a tilt angle and a tilting direction of the scanner main unit 3 based on detection results of the encoders 57 and 58.

Since the sensor block 54 can freely rotate 360° around the two axes, the attitude detecting unit 25 enables to perform an attitude detection in all directions no matter what attitude the attitude detecting unit 25 takes (for instance, even when the attitude detecting unit 25 is upside down).

In the attitude detection, in a case where a high responsiveness is required, although the attitude detection and an attitude control are performed based on the detection result of the second tilt sensor 56, the second tilt sensor 56 has poorer detection accuracy than the first tilt sensor 55 in general.

In the attitude detecting unit 25, by comprising the first tilt sensor 55 with high accuracy and the second tilt sensor 56 with high responsiveness, the arithmetic control component 26 performs the attitude control based on the detection result of the second tilt sensor 56 and can perform the attitude detection with high accuracy by the first tilt sensor 55.

The arithmetic control component 26 can calibrate the detection result of the second tilt sensor 56 based on the detection result of the first tilt sensor 55. That is, if a deviation occurs between values of the encoders 57 and 58 of when the first tilt sensor 55 detects the horizontal, that is, between an actual tilt angle and the tilt angle detected by the second tilt sensor 56, the arithmetic control component 26 can calibrate the tilt angle of the second tilt sensor 56 based on the deviation.

Therefore, by obtaining a relationship between the detected tilt angle of the second tilt sensor 56 and the tilt angles which are obtained based on a horizontal detection by the first tilt sensor 55 and the detection results of the encoders 57 and 58 in advance, the arithmetic control component 26 can calibrate the tilt angle detected by the second tilt sensor 56. Therefore, an accuracy of the attitude detection with high responsiveness by the second tilt sensor 56 can be improved.

When a fluctuation in a tilt is large and/or when a change in a tilt is rapid, the arithmetic control component 26 controls the motors based on a signal from the second tilt sensor 56. Further, when a fluctuation in the tilt is small and/or when a change in the tilt is slow, that is, in a state where the first tilt sensor 55 is capable of following up, the arithmetic control component 26 controls the motors based on a signal from the first tilt sensor 55.

It is to be noted that the storage component 27 stores programs for performing various type of processes of the present embodiment and comparison data which shows a comparison result between the detection result of the first tilt sensor 55 and the detection result of the second tilt sensor 56. The arithmetic control component 26 calibrates the detection result by the second tilt sensor 56 based on the signal from the first tilt sensor 55. This calibration enables to improve the detection result by the second tilt sensor 56 to a detection accuracy of the first tilt sensor 55. Thus, in the attitude detection by the attitude detecting unit 25, the high responsiveness can be realized while maintaining the high accuracy.

The image pickup component 22 is a camera which has a field angle of 50°, for instance, has an image pickup optical axis 59 parallel to the reference optical axis O of the scanner main unit 3 and acquires image data including a scanning range of the scanner main unit 3. A positional relationship (distance) between the image pickup optical axis 59 and the projection optical axis 33 and a positional relationship (distance) between the image pickup optical axis 59 and the reference optical axis O are known. Further, the image pickup component 22 can acquire video images or continuous images.

The image pickup control component 28 controls an image pickup of the image pickup component 22 in a case where the image pickup component 22 picks up the video images or the continuous images, the arithmetic control component 26 synchronizes a timing of acquiring a frame image constituting the video images or the continuous images with a timing of scanning by the scanner main unit 3. The arithmetic control component 26 also carries out associating the images with the point cloud data.

An image pickup element 61 of the image pickup component 22 is a CCD or a CMOS sensor which is an aggregate of pixels, and it is so arranged that a position of each pixel on an image element can be specified. For instance, each pixel has pixel coordinates in a coordinate system with the image pickup optical axis 59 as an origin point, and the position of each pixel on the image element can be specified by the pixel coordinates.

The image processing component 29 performs image processings such as an edge detection processing, a feature point extraction, an image tracking processing, an image matching and the like to the image data acquired by the image pickup component 22.

Various types of programs are stored in the storage component 27. These programs include: a control program for executing the distance measurement, a program for preparing three-dimensional point cloud data based on the distance measurement result, a program for projecting the distance measuring light 39 at predetermined deflection angle and in a predetermined deflection direction, a program for detecting an intersection portion (ridge line) of a plane and a plane based on the point cloud data, a program for comparing positions of a ridge line as detected and a ridge line on design drawing data (three-dimensional CAD data) 63 stored in advance, a control program for making the image pickup component 22 acquire an image, a program for making the image processing component 29 perform predetermined image processings such as an edge detection or the like with respect to an image as acquired, a program for comparing a portion of the edge detection and the design drawing data 63, and other programs. The arithmetic control component 26 performs (or opens) the programs stored in the storage component 27 and performs processings and operations as required.

Further, the storage component 27 stores distance measurement results as obtained and the point cloud data as prepared and also stores the three-dimensional design drawing data 63 of the object to be measured and the like in advance.

On the display module 30, the distance measurement results, the point cloud data as acquired, the design drawing data 63, the images picked up by the image pickup component 22 and the like can be displayed. Further, the operation module 31 can execute a start instruction of the distance measurement and the like, and a setting change and the like.

The communication component 40 is constituted by a manner as required such as a wired manner, a non-wired manner and the like and is communicable with the external terminal device 47. The arithmetic control component 26 transmits various types of data to the external terminal device 47 via the communication component 40 and can display the distance measurement results, the point cloud data, the design drawing data 63, the images and the like on the terminal display module 48. Further, the start instruction of the distance measurement and the like, the setting change and the like can be executed from the external terminal device 47 via the communication component 40. That is, by transmitting an operation signal from the external terminal device 47, a remote control of the scanner main unit 3 can be performed.

In the terminal storage component 50, the design drawing data 63 is stored similarly to the storage component 27. The terminal control component 49 can display data such as the distance measurement results, the point cloud data, the images and the like which are received from the scanner main unit 3 and the design drawing data 63 stored in the terminal storage component 50 on the terminal display module 48 individually or at the same time.

A description will be given on a distance measuring operation of the scanner main unit 3.

The tripod 2 is installed on a known point or a predetermined point, and the reference optical axis O is directed toward the object to be measured. A horizontal angle (left-and-right angle) of the reference optical axis O of this moment is detected by the left-and-right angle detector 8, and the tilt angle (up-and-down angle) of the reference optical axis O with respect to the horizontal is detected by the attitude detecting unit 25.

A description will be given on a deflecting action and a scanning action of the optical axis deflecting unit 43 by referring to FIG. 5A to FIG. 5C.

Figure 5A:
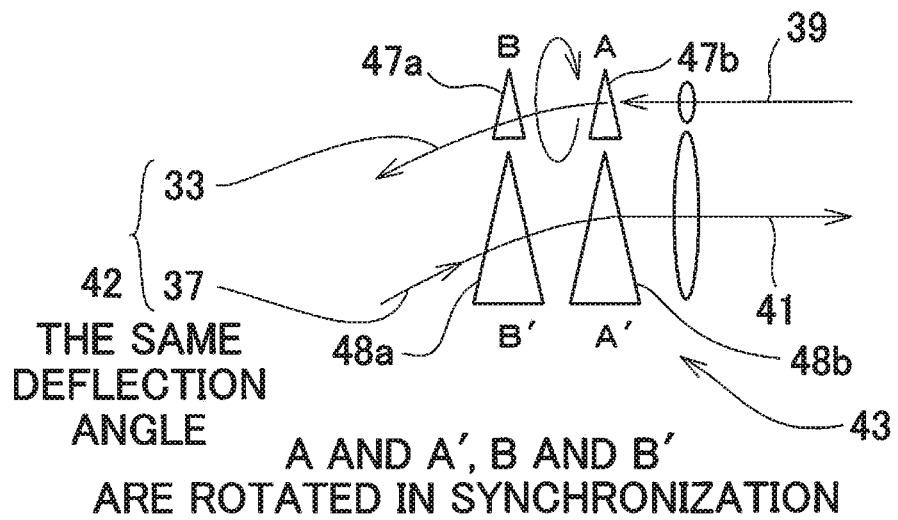
FIG. 5A, FIG. 5B, and FIG. 5C are drawings to explain an action of the optical axis deflecting unit.

It is to be noted that, in order to simplify an explanation, in FIG. 5A, the optical prisms 46a and 46b are shown by separating the prism elements 47a and 47b and the prism elements 48a and 48b. Further, FIG. 5A shows a state where the prism elements 47a and 47b and the prism elements 48a and 48b are positioned in the same direction, and, in this state, a maximum deflection angle can be obtained. Further, a minimum deflection angle is obtained at a position where either one of the optical prisms 46a and 46b rotates 180° and mutual optical actions of the optical prisms 46a and 46b are offset, and the deflection angle becomes 0°. Therefore, an optical axis (the distance measuring optical axis 42) of the laser beam as projected and received through the optical prisms 46a and 46b coincides with the reference optical axis O.

The distance measuring light 39 is emitted from the light emitting element 34. The distance measuring light 39 is turned to a parallel luminous flux by the projecting lens 35, passes through the distance measuring light deflecting unit 43a (the prism elements 47a and 47b), and is projected toward the object to be measured or the measurement range. Here, as a result of passing through the distance measuring light deflecting unit 43a, the distance measuring light 39 is deflected in a direction as required by the prism elements 47a and 47b and is projected.

The reflected distance measuring light 41 as reflected by the object to be measured or the measurement range is entered through the reflected distance measuring light deflecting unit 43b, and is focused on the photodetector 45 by the image forming lens 44.

When the reflected distance measuring light 41 passes through the reflected distance measuring light deflecting unit 43b, an optical axis of the reflected distance measuring light 41 is deflected by the prism elements 48a and 48b so as to coincide with the light receiving optical axis 37 (FIG. 5A).

By combining the rotational position of the optical prism 46a with the rotational position of the optical prism 46b, a deflecting direction and a deflection angle of the distance measuring light 39 to be projected can be arbitrarily changed.

Further, in a state where a positional relationship between the optical prism 46a and the optical prism 46b is fixed (in a state where a deflection angle obtained by the optical prism 46a and the optical prism 46b is fixed), the optical prism 46a and the optical prism 46b are integrally rotated by the motors 52a and 52b. In this case, a locus drawn by the distance measuring light 39 passing through the distance measuring light deflecting unit 43a becomes a circle with the distance measuring optical axis 42 as the center.

Therefore, when the optical axis deflecting unit 43 is rotated while emitting the laser beam from the light emitting element 34, the distance measuring light 39 can be scanned by a circular locus. It is to be noted that it is needless to say that the reflected distance measuring light deflecting unit 43b rotates integrally with the distance measuring light deflecting unit 43a.

Figure 5B:
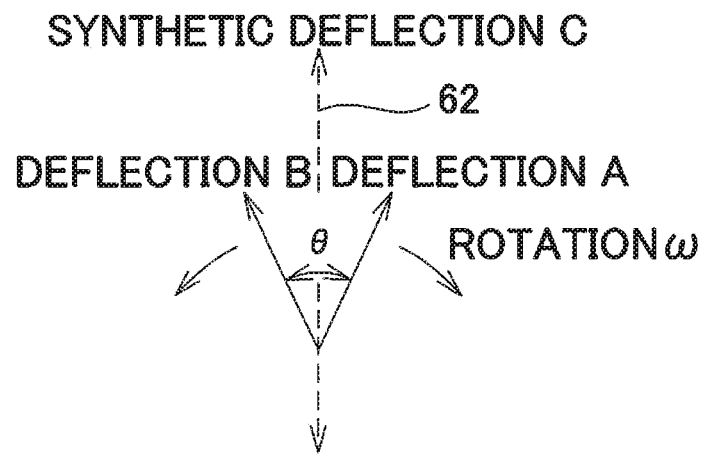

Next, FIG. 5B shows a case where the optical prism 46a and the optical prism 46b are relatively rotated. Assuming that a deflecting direction of an optical axis as deflected by the optical prism 46a is a deflection "A" and a deflecting direction of an optical axis as deflected by the optical prism 46b is a deflection "B", the deflection of the optical axis by the optical prisms 46a and 46b becomes a synthetic deflection "C" with an angle difference θ between the optical prisms 46a and 46b.

Therefore, in a case where the optical prism 46a and the optical prism 46b are synchronized in an opposite direction and reciprocally rotated at a constant speed, the distance measuring light passed through the optical prisms 46a and 46b is scanned linearly. Therefore, when the optical prism 46a and the optical prism 46b are reciprocally rotated in the opposite direction at the constant speed, as shown in FIG. 5B, the distance measuring light 39 can be reciprocally scanned in a direction of the synthetic deflection C by a linear locus 62.

Figure 5C:
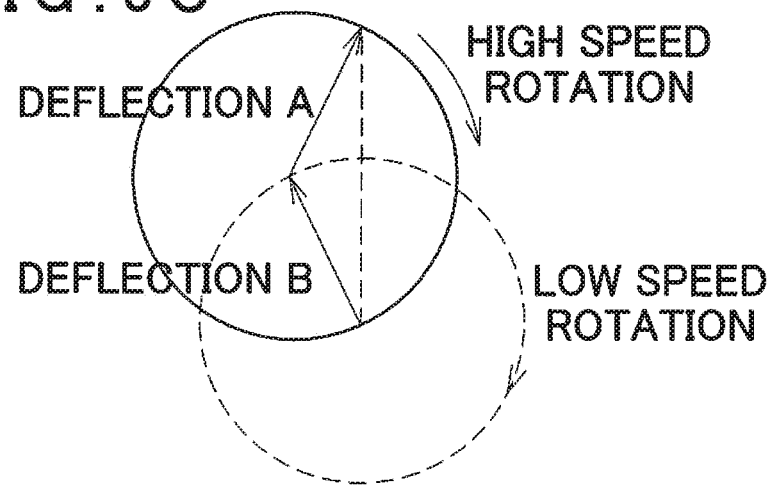

Further, as shown in FIG. 5C, when the optical prism 46b is rotated at a rotating speed lower than a rotating speed of the optical prism 46a, since the distance measuring light 39 is rotated while the angle difference θ gradually increases, a scanning locus of the distance measuring light 39 becomes a spiral form.

Furthermore, by individually controlling the rotating directions and the rotating speeds of the optical prism 46a and the optical prism 46b, various scanning patterns, e.g., a pattern where the scanning locus of the distance measuring light 39 made in an irradiation direction (scanning in a radial direction) with the reference optical axis O as the center, or in the horizontal direction, or in the vertical direction, or the like can be obtained.

When a structure such as a building or the like is constructed, various types of processes such as an installation of pipelines, interiors and the like are sequentially performed, and a construction is proceeded with. Further, when the structure is constructed, each time a performance of each process is finished, a three-dimensional shape of an inside of the structure is measured. The arithmetic control component 26 compares the three-dimensional shape as measured and the three-dimensional design drawing data 63, and checks whether the pipelines and the like are installed at accurate positions or the ridge lines and the like are formed at accurate positions or the like, and judges whether each process has been accurately executed.

By using FIG. 6 to FIG. 9, a description will be given below on an acquirement of three-dimensional point cloud data (scanning data) using the laser scanner 1 and comparison processings (construction checking processings) between the three-dimensional point cloud data and the design drawing data 63.

First, the scanner main unit 3 is installed via the tripod 2 at an installation point having known coordinates. It is to be noted that the coordinates of the installation point are coordinates in a coordinate system of the design drawing data 63 stored in the storage component 27 in advance.

Figure 6:
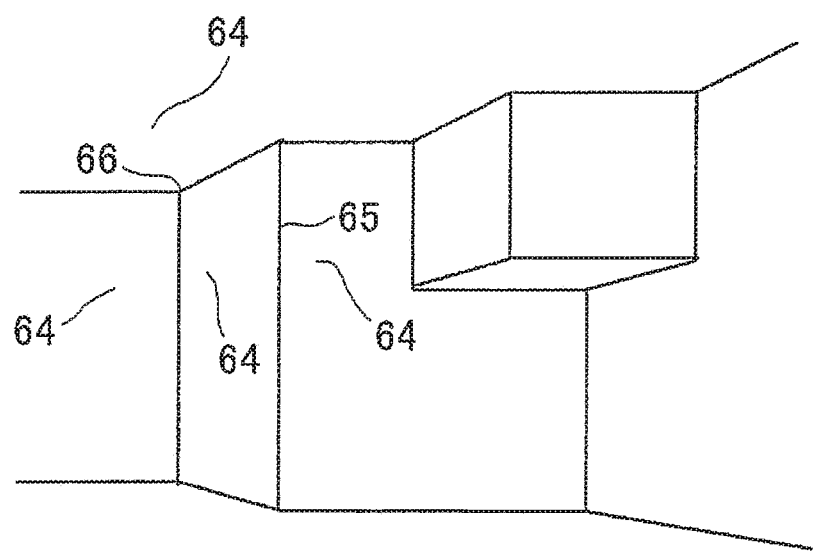
FIG. 6 is an explanatory drawing to show a state where design drawing data is read on a display module.

After the scanner main unit 3 is installed, as shown in FIG. 6, the arithmetic control component 26 reads the design drawing data 63 from the storage component 27 and displays the design drawing data 63 on the display module 30.

The arithmetic control component 26 sets the measurement range based on the design drawing data 63. For instance, the scanner main unit 3 is directed toward an intersection portion (ridge line) 65 of two planes 64 and 64 or an intersection portion (intersection point) 66 of three planes 64, 64, and 64 on the design drawing data 63. That is, the arithmetic control component 26 drives the left-and-right motor 12 and the up-and-down motor 17 so that the reference optical axis O is positioned on an end portion of the virtual ridge line 65 obtained from the design drawing data 63 or so that the reference optical axis O is positioned on the virtual intersection point 66 obtained from the design drawing data 63.

Figure 7:
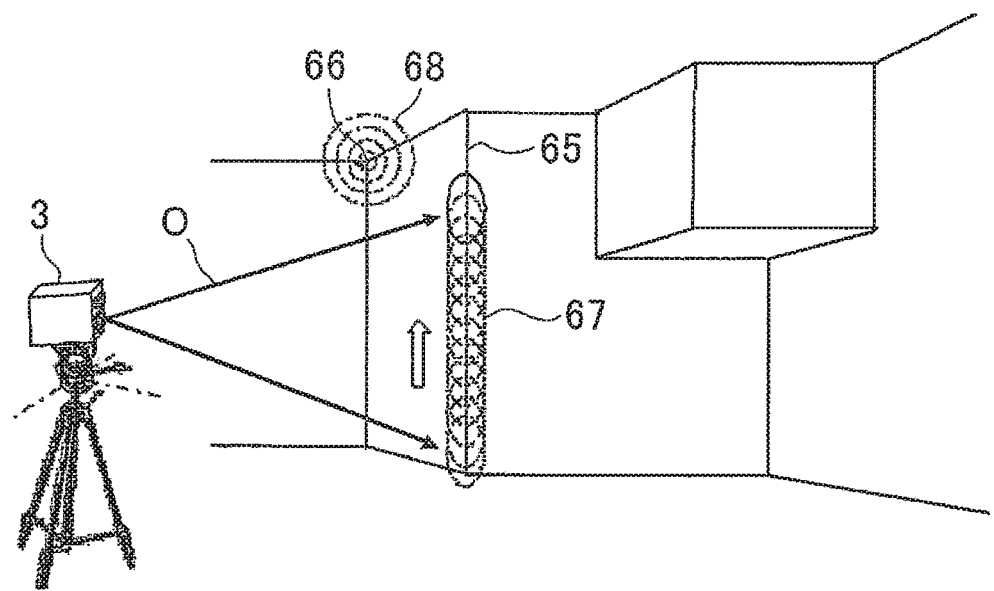
FIG. 7 is an explanatory drawing to show a scanning state of a ridge line and an intersection point by the laser scanner.

For instance, as shown in FIG. 7, in a case where the ridge line 65 extending in the up-and-down direction is extracted, the arithmetic control component 26 drives the left-and-right motor 12 and the up-and-down motor 17 so that the reference optical axis O is positioned at a lower end of the ridge line 65.

After the scanner main unit 3 is directed toward the lower end of the ridge line 65, the optical prism 46a and the optical prism 46b are integrally rotated under a predetermined scanning condition, for instance, in a state where the positional relationship between the optical prism 46a and the optical prism 46b is fixed, and the arithmetic control component 26 drives the up-and-down motor 17 at a predetermined speed so that the reference optical axis O is moved upward along the ridge line 65. It is to be noted that, if the ridge line 65 is a curved line, a direction of the reference optical axis O is changed by a cooperation between the left-and-right motor 12 and the up-and-down motor 17.

As a result, the distance measuring light 39 is moved upward along the ridge line 65 and draws a trochoid-shaped locus 67 along the ridge line 65 while rotating with the reference optical axis O as the center in a state where the reference optical axis O is deflected by a predetermined deflection angle.

It is to be noted that it may be so configured that the up-and-down motor 17 is driven by a predetermined amount each time the optical prism 46a and the optical prism 46b are rotated one round. In this case, the locus 67 of the distance measuring light 39 becomes a locus in which circles are connected along the ridge line 65.

By moving the reference axis O to an upper end of the ridge line 65, the distance measuring light 39 is scanned along the locus 67, and the three-dimensional point cloud data of the planes 64 and 64 positioned in a periphery of the ridge line 65 is acquired. The point cloud data as acquired is stored in the storage component 27.

Further, as shown in FIG. 7, in a case where the intersection point 66 is extracted, the arithmetic control component 26 drives the left-and-right motor 12 and the up-and-down motor 17 so that the reference optical axis O is positioned on the intersection point 66.

After the scanner main unit 3 is directed toward the intersection point 66, the arithmetic control component 26 rotates the optical prism 46b at a rotating speed lower than the rotating speed of the optical prism 46a under a predetermined scanning condition, for instance, from a state where the deflection angle of the distance measuring light 39 by the optical axis deflecting unit 43 is set 0°.

As a result, since the distance measuring light 39 is rotated with the reference optical axis O as the center while the deflection angle is gradually increased, a locus 68 in a spiral form around the intersection point 66 is drawn.

It is to be noted that the deflection angle of the distance measuring light 39 may be gradually increased each time the optical prism 46a and the optical prism 46b are rotated one round. In this case, the locus 68 of the distance measuring light 39 becomes a locus in a concentric circle form around the intersection point 66.

By rotating the optical prism 46a and the optical prism 46b for the predetermined number of times, the distance measuring light 39 is scanned along the locus 68, and the three-dimensional point cloud data of the planes 64, 64, and

64 as positioned in the periphery of the intersection point 66 is acquired. The point cloud data as acquired is stored in the storage component 27.

Figure 8:
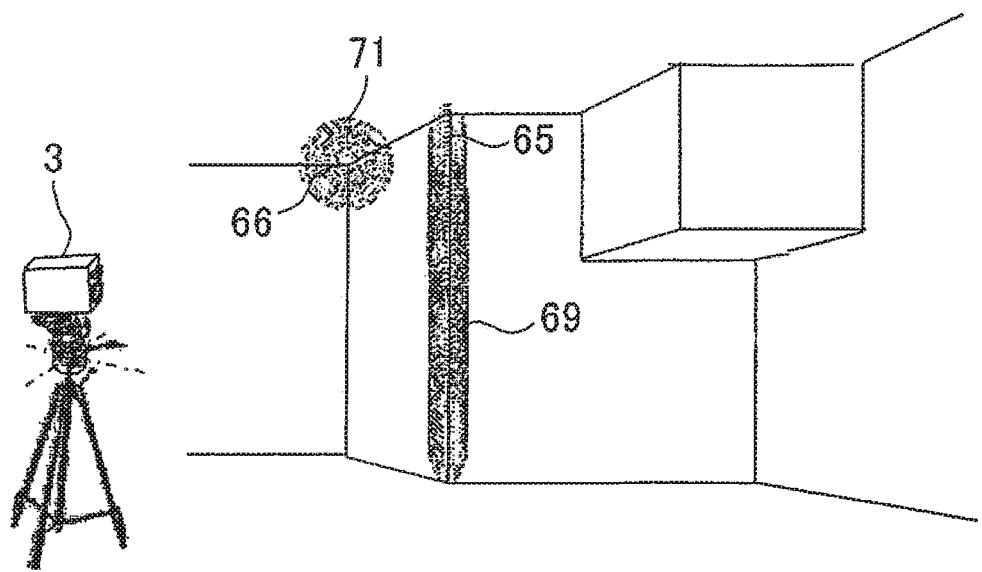
FIG. 8 is an explanatory drawing to show scanning data of the ridge line and the intersection point acquired by the laser scanner.

FIG. 8 shows the point cloud data acquired by the processings as described above. In FIG. 8, a reference numeral 69 denotes point cloud data (scanning data) acquired on the locus 67, and a reference numeral 71 denotes point cloud data (scanning data) acquired on the locus 68.

The arithmetic control component 26 extracts an intersection portion of the planes 64 and 64, that is, an actual ridge line 65 of the structure (see FIG. 9) based on the three-dimensional coordinates of the point cloud data 69. The three-dimensional coordinates regarding the ridge line 65' as extracted is calculated by the arithmetic control component 26 and stored in the storage component 27.

Further, the arithmetic control component 26 extracts an intersection portion of the planes 64, 64, and 64, that is, an actual intersection point 66' of the structure (see FIG. 9) based on the three-dimensional coordinates of the point cloud data 71. The three-dimensional coordinates of the intersection point 66' as extracted is calculated by the arithmetic control component 26 and stored in the storage component 27.

After the ridge line 65' and the intersection point 66' as desired are extracted, and actual three-dimensional coordinates of the ridge line 65' and the intersection point 66' are acquired, positions of the ridge line 65' and the intersection point 66' as extracted are compared with positions (three-dimensional coordinates) of the ridge line 65 and the intersection point 66 on the design drawing data 63 by the arithmetic control component 26.

Figure 9:
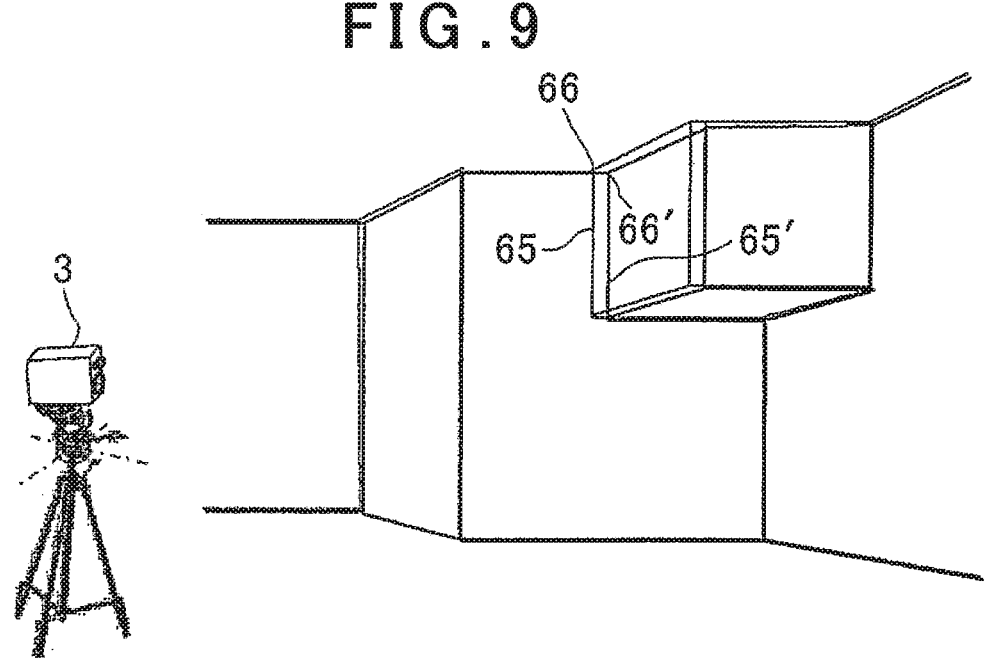
FIG. 9 is an explanatory drawing to show a state where the ridge line and the intersection point on the design drawing data and the ridge line and the intersection point extracted from the scanning data are superimposed.

FIG. 9 shows a state where the ridge line 65 and the intersection point 66 on the design drawing data 63 and the ridge line 65' and the intersection point 66' of an actual structure as extracted are displayed on the display module 30 while being superimposed on each other at the same time.

As shown in FIG. 9, in a case where each process is performed according to the design drawing data 63, the ridge line 65 and the intersection point 66 are displayed while the ridge line 65' and the intersection point 66' are superimposed on each other. Further, in a case where each process has not been performed according to the design drawing data 63, the positions of the ridge line 65 and the intersection point 66 do not coincide with the positions of the ridge line 65' and the intersection point 66', and are displayed while being deviated from each other.

It is to be noted that the ridge line 65 and the intersection point 66 or the ridge line 65' and the intersection point 66', which are deviated, may be displayed in different colors from each other. By displaying the ridge line 65 and the intersection point 66 in a color different from a color of the ridge line 65' and the intersection point 66', an operator can immediately check a point where each process is not performed according to the design drawing data 63.

The operator carries out a re-construction or a modification of the structure based on a comparison result between the ridge line 65 and the intersection point 66 and the ridge line 65' and the intersection point 66'. After the re-construction, the point cloud data is acquired again regarding a point where the re-construction was carried out, the ridge line 65' and the intersection point 66' are extracted, and the positions of the ridge line 65' and the intersection point 66' are compared with the positions of the ridge line 65 and the intersection point 66.

Regarding a re-construction point, in a case where the positions of the ridge line 65 and the intersection point 66 coincide with the positions of the ridge line 65' and the intersection point 66', or a deviation between the positions of the ridge line 65 and the intersection point 66 and the positions of the ridge line 65' and the intersection point 66' is within an allowable error, the construction checking processings in the construction process are finished, and a construction of a subsequent process is carried out.

It is to be noted that, in the above, although the construction checking processings are carried out based on the ridge line 65' extracted from the point cloud data 69 and the intersection point 66' extracted from the point cloud data 71, images may be further used.

First, the arithmetic control component 26 makes the image pickup component 22 pick up an image of an entire range inside the structure. Next, the image processing component 29 carries out the matching processing with respect to each image and prepares a total circumferential image of the entire range inside the structure.

Further, the image processing component 29 carries out the edge detection processing with respect to the total circumferential image as prepared and extracts a ridge line 65" and an intersection point 66".

The arithmetic control component 26 compares to check on the design drawing data 63, whether there are the ridge line 65 and the intersection point 66 coinciding with the ridge line 65" and the intersection point 66" extracted from the image or whether there are the ridge line 65 and the intersection point 66 corresponding to the ridge line 65" and the intersection point 66" extracted from the image.

Figure 10:
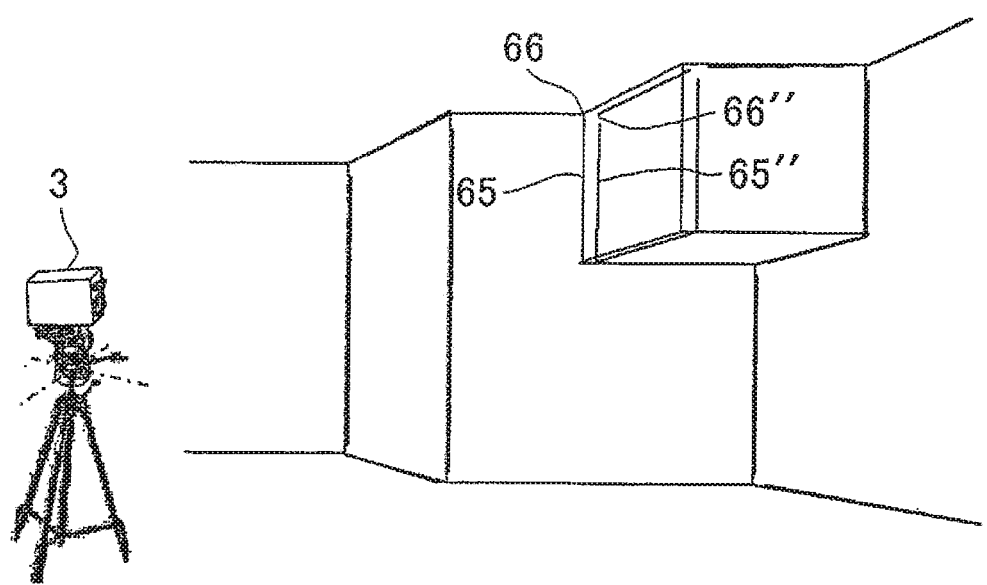
FIG. 10 is an explanatory drawing to show a state where the ridge line and the intersection point on the design drawing data and the ridge line and the intersection point extracted from an image are superimposed.

As shown in FIG. 10, there is no ridge line 65 and intersection point 66 corresponding to the ridge line 65" and the intersection point 66" extracted from the image on the design drawing data 63 displayed on the display module 30.

The arithmetic control component 26 acquires the point cloud data 69 along the ridge line 65" with respect to a point as judged in which there is no ridge line 65 and intersection point 66 coinciding with or corresponding to the ridge line 65" and the intersection point 66" extracted from the image and acquires the point cloud data 71 around the intersection point 66".

The arithmetic control component 26 extracts the actual accurate ridge line 65' and the actual accurate intersection point 66' based on the point cloud data 69 and 71 and compares the positions of the actual accurate ridge line 65' and the actual accurate intersection point 66' with the positions of the ridge line 65 and the intersection point 66. In a case where the positions of the actual accurate ridge line 65' and the actual accurate intersection point 66' are different from the positions of the ridge line 65 and the intersection point 66 or there is no ridge line 65 and intersection point 66 corresponding to the actual accurate ridge line 65' and the actual accurate intersection point 66', the re-construction or the modification is carried out with respect to a corresponding point.

It is to be noted that, in the above, although the ridge line 65" and the intersection point 66" with the positions different from the positions of the ridge line 65' and the intersection point 66' are extracted, it is needless to say that a hole, a graded step and the like which do not exist on the design drawing data 63 can be detected by the construction checking processings using an image.

Further, based on the ridge line 65" and the intersection point 66" extracted by the image processing and the ridge line 65' and the intersection point 66' extracted from the point cloud data 69 and the point cloud data 71, the image can be matched with the point cloud data 69 and 71. Further, based on the point cloud data 69 acquired along the ridge line 65" and the point cloud data 71 acquired around the intersection point 66", the design drawing data 63 can be matched with the image.

As described above, in the present embodiment, in the construction checking processings at each construction process carried out in a construction of the structure, the point cloud data 69 in the periphery of the ridge line 65 and the point cloud data 71 in the periphery of the intersection point 66 on the design drawing data 63 are acquired, the ridge line 65' and the intersection point 66' are extracted based on the point cloud data 69 and 71, and based on the ridge line 65' and the intersection point 66', whether each process is performed according to the design drawing data 63 is checked.

Therefore, it would suffice if point cloud data of only a necessary point is acquired, and there is no need to acquire point cloud data of a total circumference of 360° over the entire range inside the structure. As a result, a time for acquiring point cloud data can be extensively shortened.

Further, the number of point cloud data to be acquired is reduced. As a result, the number of data used in a calculation for extracting the ridge line 65' and the intersection point 66' can be reduced, a time for extracting the ridge line 65' and the intersection point 66' can be shortened, and a process of a calculation can be reduced.

Further, when the construction checking processings are carried out, the scanner main unit 3 is automatically directed toward the ridge line 65 and the intersection point 66 based on the design drawing data 63. As a result, the operator does not need to manually direct the scanner main unit 3 toward the ridge line 65 and the intersection point 66, and a work load can be reduced.

Thus, the time required for the construction checking processings carried out after the performance of each process can be shortened, and a workability of when the structure is constructed can be improved.

Further, in the present embodiment, based on the image picked up by the image pickup component 22, the ridge line 65" and the intersection point 66" are extracted and compared to judge whether there are the ridge line 65 and the intersection point 66 coinciding with or corresponding to the ridge line 65" and the intersection point 66".

Therefore, a portion such as a graded step provided in extra in the structure, a hole formed in extra on the plane 64 or the like, which could not be detected only by the point cloud data of the periphery of the ridge line 65 and the intersection point 66, can be detected. As a result, an accuracy of the construction checking processings can be improved.

It is to be noted that, in the present embodiment, the point cloud data 69 is acquired along the virtual ridge line 65, and the actual ridge line 65' is obtained. On the other hand, in a case where the ridge line 65' is a straight line, it may be so configured that the point cloud data 71 and 71 around the intersection points 66 and 66 on both ends of the ridge line 65 are acquired, the intersection points 66' and 66' are extracted based on the point cloud data 71 and 71, and a line connecting the intersection points 66' and 66' is determined as the ridge line 65'.

By carrying out the processings as described above, the number of the point cloud data to be acquired can be further reduced. As a result, the time for acquiring the point cloud data can be further shortened, and the workability can be further improved.

Further, in the present embodiment, although the design drawing data 63, the ridge lines 65, 65', 65", the intersection points 66, 66', 66" and the like are displayed on the display module 30, data may be transmitted via the communication component 40 and the design drawing data 63, the ridge lines 65, 65', 65", the intersection points 66, 66', 66" and the like are displayed on the terminal display module 48 of the external terminal device 47.

Further, it is needless to say that, based on an instruction from the terminal display module 48, the ridge lines 65, 65', 65", the intersection points 66, 66', 66' and the like as received via the communication component 40 may be displayed with the design drawing data 63 stored in the terminal storage component 50 on the terminal display module 48 at the same time.

The invention claimed is:

1. A laser scanner comprising: a scanner main unit, a support unit for supporting said scanner main unit rotatably in an up-and-down direction and in a left-and-right direction, a rotation driving unit for rotating said scanner main unit in the up-and-down direction and in the left-and-right direction and an angle detector for detecting an up-and-down angle and a left-and-right angle of said scanner main unit, wherein said scanner main unit has a light emitting element for emitting a distance measuring light, a distance measuring light projecting component for projecting said distance measuring light, a light receiving component for receiving a reflected distance measuring light, a photodetector for receiving said reflected distance measuring light and producing a light receiving signal, a distance measuring component for performing a distance measurement of an object to be measured based on said light receiving signal from said photodetector, an optical axis deflecting unit provided on a distance measuring optical axis and for deflecting said distance measuring optical axis, a projecting direction detecting unit for detecting a deflection angle of said distance measuring optical axis, a storage component which stores three-dimensional design drawing data of said object to be measured and a control component for controlling an operation of said rotation driving unit, a deflecting operation of said optical axis deflecting unit and a distance measuring operation of said distance measuring component, wherein said optical axis deflecting unit comprises a pair of optical prisms which enables to rotate with said distance measuring optical axis as a center and motors for individually and independently rotating said optical prisms, and wherein said control component is configured to set a measurement range based on said design drawing data, to control said rotation driving unit and direct said scanner unit toward a ridge line or intersection point in said design drawing data, to acquire a scanning data by scanning said distance measuring light in said measuring range and to extract an actual ridge line or an actual intersection point of said object to be measured based on said scanning data acquire a scanning data.

2. The laser scanner according to claim 1, wherein said scanner main unit is installed at a known point, and said control component controls said rotation driving unit and said optical axis deflecting unit so as to acquire said scanning data around virtual intersection points at two points on said design drawing data, extracts actual intersection points at two points from said scanning data as acquired and extracts a line connecting said actual intersection points at the two points as said actual ridge line.

3. The laser scanner according to claim 1,
wherein said scanner main unit is installed at a known point, and said control component controls said rotation driving unit and said optical axis deflecting unit so as to acquire said scanning data along a virtual ridge line on said design drawing data, extracts said actual ridge line from said scanning data as acquired and compares a position of said actual ridge line and a position of said virtual ridge line.

4. The laser scanner according to claim 3, wherein a display module is provided in said scanner main unit, and said display module displays said actual ridge line or said actual intersection point and said virtual ridge line or said virtual intersection point at the same time.

5. The laser scanner according to claim 4, wherein said display module displays said actual ridge line or said actual intersection point and said virtual ridge line or said virtual intersection point in different colors.

6. The laser scanner according to claim 4,
wherein said scanner main unit further comprises an image pickup component having an image pickup optical axis in parallel to said distance measuring optical axis which is not deflected by said optical axis deflecting unit, and an image processing component, wherein said image processing component extracts a ridge line and an intersection point of said object to be measured by an edge detection processing from an image acquired by said image pickup component, and wherein said control component acquires said scanning data within a measurement range as set based on said ridge line or said intersection point extracted from said image in a case where there is no virtual ridge line or virtual intersection point coinciding with or corresponding to said ridge line or said intersection point extracted from said image and makes said actual ridge line or said actual intersection point extracted from said scanning data display on said display module.

7. The laser scanner according to claim 6,
wherein said control component makes said image match with said scanning data based on said actual ridge line or said actual intersection point extracted from said image and said ridge line or said intersection point extracted from said scanning data.

8. The laser scanner according to claim 3, further comprising a communication component which enables to communicate with an external terminal device, and configured to enable to transmit data from said scanner main unit to said external terminal device via said communication component, to transmit an operation signal of said scanner main unit from said external terminal device, and to remotely control said scanner main unit.

9. The laser scanner according to claim 8,
wherein said external terminal device has a terminal display module, and said control component makes said actual ridge line or said actual intersection point and said virtual ridge line or said virtual intersection point display on said terminal display module at the same time.

10. The laser scanner according to claim 8,
wherein said external terminal device has a terminal storage component which stores said three-dimensional design drawing data of said object to be measured, said terminal display module and a terminal control component, and the terminal control component makes said actual ridge line or said actual intersection point and said virtual ridge line or said virtual intersection point display on said terminal display module at the same time based on the data received from said scanner main unit.

11. The laser scanner according to claim 1,
wherein said scanner main unit is installed at a known point, and said control component controls said rotation driving unit and said optical axis deflecting unit so as to acquire said scanning data around said virtual intersection point on said design drawing data, extracts said actual intersection point from said scanning data as acquired and compares a position of said actual intersection point and a position of said virtual intersection point.

12. The laser scanner according to claim 11, wherein a display module is provided in said scanner main unit, and said display module displays said actual ridge line or said actual intersection point and said virtual ridge line or said virtual intersection point at the same time.

13. The laser scanner according to claim 12, wherein said display module displays said actual ridge line or said actual intersection point and said virtual ridge line or said virtual intersection point in different colors.

14. The laser scanner according to claim 12, wherein said scanner main unit further comprises an image pickup component having an image pickup optical axis in parallel to said distance measuring optical axis which is not deflected by said optical axis deflecting unit, and an image processing component, wherein said image processing component extracts a ridge line and an intersection point of said object to be measured by an edge detection processing from an image acquired by said image pickup component, and wherein said control component acquires said scanning data within a measurement range as set based on said ridge line or said intersection point extracted from said image in a case where there is no virtual ridge line or virtual intersection point coinciding with or corresponding to said ridge line or said intersection point extracted from said image and makes said actual ridge line or said actual intersection point extracted from said scanning data display on said display module.

15. The laser scanner according to claim 14, wherein said control component makes said image match with said scanning data based on said actual ridge line or said actual intersection point extracted from said image and said ridge line or said intersection point extracted from said scanning data.

16. The laser scanner according to claim 11, further comprising a communication component which enables to communicate with an external terminal device, and configured to enable to transmit data from said scanner main unit to said external terminal device via said communication component, to transmit an operation signal of said scanner main unit from said external terminal device, and to remotely control said scanner main unit.

17. The laser scanner according to claim 16, wherein said external terminal device has a terminal display module, and said control component makes said actual ridge line or said actual intersection point and said virtual ridge line or said virtual intersection point display on said terminal display module at the same time.

18. The laser scanner according to claim 16, wherein said external terminal device has a terminal storage component which stores said three-dimensional design drawing data of said object to be measured, said terminal display module and a terminal control component, and the terminal control component makes said actual ridge line or said actual intersection point and said virtual ridge line or said virtual intersection point display on said terminal display module at the same time based on the data received from said scanner main unit.

* * * * *